US012009617B2

(12) United States Patent
Schmitt et al.

(10) Patent No.: US 12,009,617 B2
(45) Date of Patent: Jun. 11, 2024

(54) FIXATION DEVICE FOR AFFIXING A CONTACT ELEMENT IN A HOUSING OF A CONNECTOR

(71) Applicant: TE Connectivity Germany GmbH, Bensheim (DE)

(72) Inventors: Thomas Schmitt, Bensheim (DE); Jens Nickel, Bensheim (DE); Walter Saenger, Bensheim (DE); Christian Gregor, Bensheim (DE); Martin Listing, Bensheim (DE); Rolf Jetter, Bensheim (DE); Christoph Kosmalski, Bensheim (DE); Wolfgang Balles, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 143 days.

(21) Appl. No.: 17/496,067

(22) Filed: Oct. 7, 2021

(65) Prior Publication Data

US 2022/0115808 A1 Apr. 14, 2022

(30) Foreign Application Priority Data

Oct. 9, 2020 (DE) ......................... 102020126541.7

(51) Int. Cl.
*H01R 13/58* (2006.01)
*H01R 13/502* (2006.01)

(52) U.S. Cl.
CPC ....... *H01R 13/5812* (2013.01); *H01R 13/502* (2013.01); *H01R 2201/26* (2013.01)

(58) Field of Classification Search
CPC .............. H01R 13/5812; H01R 13/502; H01R 2201/26; H01R 13/533; H01R 13/426; H01R 13/436; H01R 13/434
See application file for complete search history.

(56) References Cited

U.S. PATENT DOCUMENTS 5,879,192 A 3/1999 Machida et al.
8,727,819 B2 5/2014 Giefers et al.
(Continued)

FOREIGN PATENT DOCUMENTS

CN 103531921 A 1/2014
CN 107240811 A 10/2017
(Continued)

OTHER PUBLICATIONS

Extended European Search Report, Application No. 21201639.8-1201, dated Mar. 9, 2022, 7 pages.
(Continued)

*Primary Examiner* — Abdullah A Riyami
*Assistant Examiner* — Nader J Alhawamdeh
(74) *Attorney, Agent, or Firm* — Barley Snyder

(57) ABSTRACT

A fixation device for fixing a contact element within a connector. The device includes a housing defining a contact element receptacle for receiving a contact element and a support face defining a deflection surface for supporting the contact element within the housing, and a clamping device for clamping the contact element in the contact element receptacle with a clamping force directed in a clamping direction. The deflection surface is oriented at an angle relative to the clamping direction such that it deflects a component or portion of the clamping force acting upon the contact element in a direction transverse to the clamping direction.

20 Claims, 7 Drawing Sheets

(56) References Cited

U.S. PATENT DOCUMENTS

| | | | | |
|---|---|---|---|---|
| 8,961,215 | B2 | 2/2015 | Hasegawa | |
| 9,531,105 | B2 | 12/2016 | Wimmer et al. | |
| 9,941,625 | B2 * | 4/2018 | Boemmel | H01R 13/516 |
| 9,948,032 | B2 | 4/2018 | Wimmer et al. | |
| 10,505,306 | B2 * | 12/2019 | Listing | H01R 13/533 |
| 2004/0082219 | A1 | 4/2004 | Tabata et al. | |
| 2007/0212950 | A1 | 9/2007 | Morello | |
| 2015/0111405 | A1 * | 4/2015 | Boemmel | H01R 13/426 439/345 |
| 2018/0331451 | A1 * | 11/2018 | Listing | H01R 13/41 |
| 2021/0408738 | A1 * | 12/2021 | Glaser | H01R 13/6683 |
| 2022/0115808 | A1 * | 4/2022 | Schmitt | H01R 13/502 |

FOREIGN PATENT DOCUMENTS

| | | | |
|---|---|---|---|
| DE | 696 21 082 | T2 | 9/2002 |
| DE | 10 2013 019 873 | A1 | 5/2015 |
| DE | 10 2017 208 008 | B3 | 10/2018 |
| EP | 1833122 | A2 | 9/2007 |
| EP | 3402003 | A1 | 11/2018 |
| JP | 2004146182 | A | 5/2004 |
| JP | 2018190727 | A | 11/2018 |
| KR | 101567356 | B1 | 11/2015 |

OTHER PUBLICATIONS

Indian Examination Report, Application No. 202144045398, dated Apr. 25, 2022, 8 pages.

German Office Action, dated Jun. 29, 2021, 4 pages.

Office Action from the Japan Patent Office dated Nov. 1, 2022, corresponding to Application No. 2021-164420, with English translation, 10 pages.

Office Action from Japanese Patent Office dated May 16, 2023 with English translation, corresponding to Application No. 2021-164420, 6 pages.

Chinese Office Action, Application No. 202111149508.4, dated Sep. 19, 2023, 15 pages.

* cited by examiner

FIXATION DEVICE FOR AFFIXING A CONTACT ELEMENT IN A HOUSING OF A CONNECTOR

CROSS-REFERENCE TO RELATED APPLICATIONS

This application claims the benefit of German Patent Application No. 102020126541.7 filed on Oct. 9, 2020, the entire disclosure of which is incorporated herein by reference for all purposes.

FIELD OF THE INVENTION

The present invention relates to electrical connectors, and more particularly, to an electrical connector having a contact fixation device.

BACKGROUND

Electrical connectors are often used to in harsh environments, for example, in automotive applications where connectors are regularly subject to vibration and other forms of significant motion. Over long periods of time, this motion can cause protective and/or conductive coatings formed on conductive contact elements of the electrical connectors to wear away or otherwise degrade. As a result, the electrical resistance at the transitions between adjoining contact elements can significantly increase. When subject to high currents, this increase in resistance can lead to damage, for example, to the melting of components of the connector and/or to fire.

Accordingly, improved connection systems are needed for reducing or eliminating motion of electrical contact elements within an electrical connector.

SUMMARY

According to an embodiment of the present disclosure, a fixation device for fixing a contact element within a connector is provided. The device includes a housing defining a contact element receptacle for receiving a contact element and a support face defining a deflection surface for supporting the contact element within the housing. The device further includes a clamping device for clamping the contact element in the contact element receptacle with a clamping force directed in a clamping direction. The deflection surface is oriented at an angle relative to the clamping direction such that it deflects a component or portion of the clamping force acting upon the contact element in a direction transverse to the clamping direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
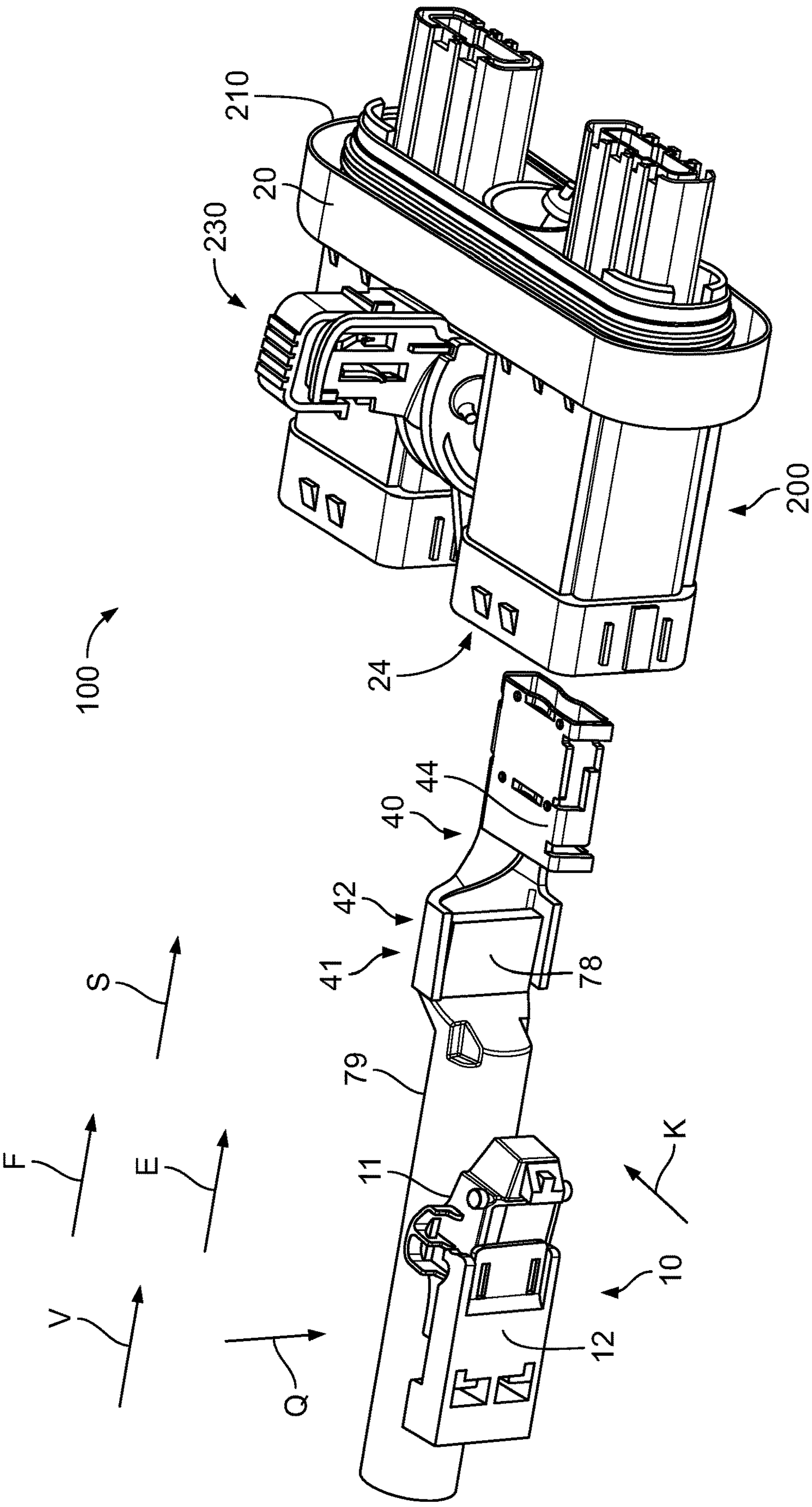
FIG. 1 shows a schematic perspective view of a first embodiment of a fixation device.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
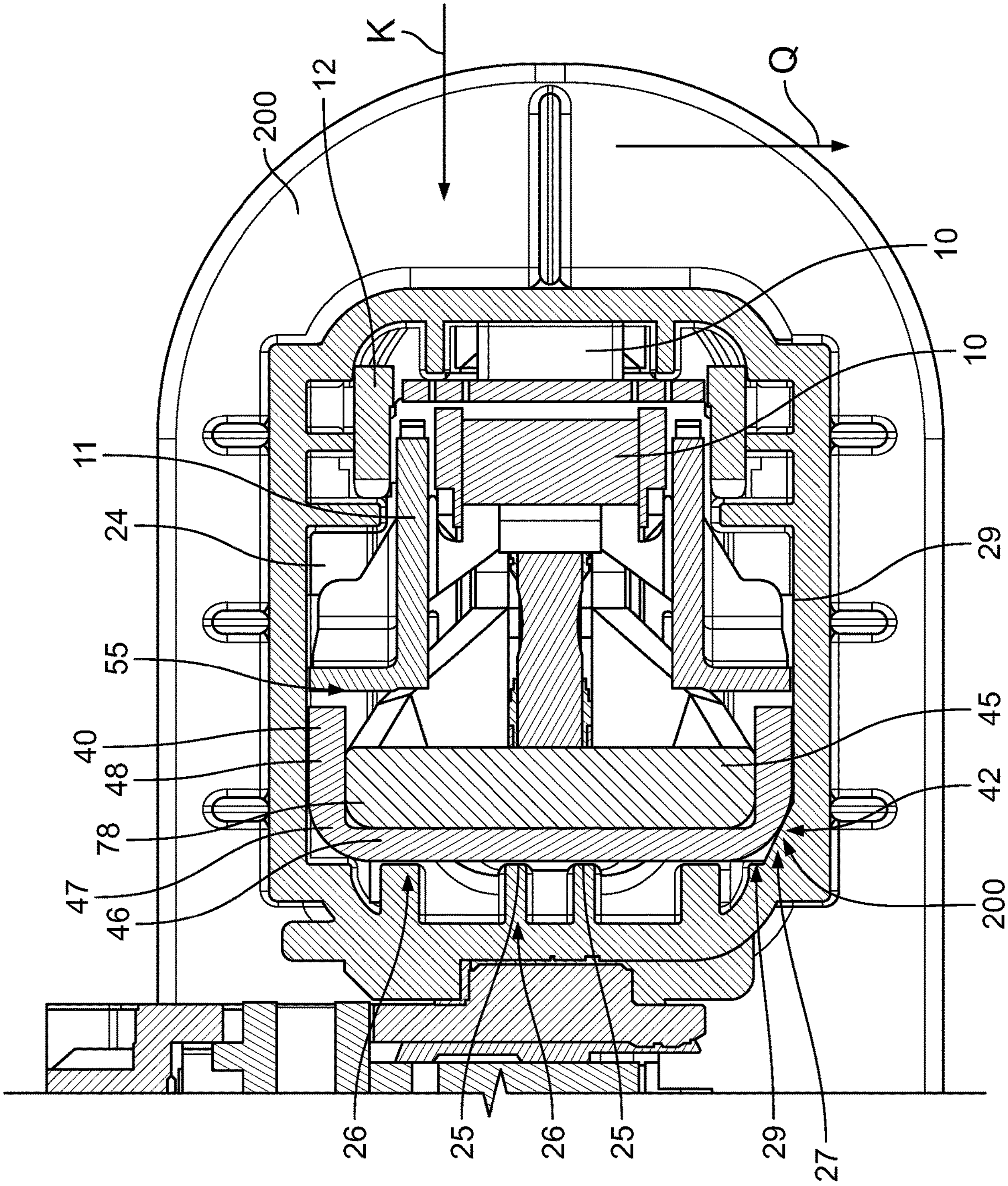
FIG. 2 shows a schematic cross-sectional view of the embodiment of FIG. 1.

A first embodiment of a fixation device 100 for affixing a contact element 40 within a housing 20 of a connector 200 is shown in FIGS. 1 and 2. The fixation device 100 includes the housing 20. The housing 20 comprises a contact element receptacle 24 which is configured to receive at least one contact element 40. The contact element 40 comprises a plugging section 44 at which it can be plugged together with a mating contact element of a mating connector. The plugging section 44 shown is configured as a socket into which a flat contact can be plugged.

The contact element 40 further includes a connecting section 42 which is connected to a conductor 78 of a cable 79. For this purpose, the contact element 40 comprises a receptacle 45 for the conductor 78. In exemplary embodiment shown, the receptacle 45 has a U-shaped cross section comprising a base 46 and two legs 48 which are connected to the base 46 by way of edges 47 and which run perpendicular to the base. The receptacle 45 forms a right-angled receiving channel which surrounds the conductor 78 on three sides. In one embodiment, the contact element 40 is made from sheet metal. The base 46 and the legs 48 are each formed to be flat. The edges 47 are formed to be rounded to allow for easy sliding.

The conductor 78 may be welded to the contact element 40. This can result, for example, from a current flow which leads to melting and thereby to fusing due to an increased resistance between conductor 78 and contact element 40. In particular, the contact element 40 can be connected to the conductor 78 along the entire U-shaped cross section in order to establish a secure connection.

The connector 200 further comprises a locking mechanism 230 which is configured to lock the connector 200 to the mating connector, not shown in detail. Sealing elements 210 are also present at a front side for sealing purposes. Sealing elements on a rear side are likewise used for sealing purposes, in particular against the cable 79.

The fixation device 100 further comprises a clamping device 10 which is configured to clamp at least one contact element 40 in the contact element receptacle 24 with a clamping force 110 directed in a clamping direction K.

In a clamped state, the contact element 40 on the side facing away from the clamping device 10 rests at least in sections in the housing 20 on a support surface 25 which comprises a deflection surface 27 oriented at an angle to the clamping force 110. The deflection surface 27 is configured to deflect the clamping force 110 acting upon the contact element 40 at least component-wise, or partially, transverse to the clamping force and to the clamping direction K. As a result, the contact element 40 is clamped in two spatial directions within the contact element receptacle 24 and is affixed in a vibration-resistant manner.

The clamping device 10 comprises a clamping body 11 and a slide 12 which is slidable relative to the clamping body along a sliding direction V. The clamping body 11 and the slide 12 are configured to press the clamping body 11 along the clamping direction K against the contact element 40 when the slide 12 slides along the sliding direction V. In an advantageous configuration, the clamping device 10, in particular the clamping body 11, only engages at the legs 48 of the U-shaped receptacle 45. This can lead to less mechanical stress on the contact element 40 and less deformation.

In order to have the clamping device 10 together with the contact element 40 spread apart and thereby catch in the contact element receptacle 24, the clamping body 11 and the slide 12 interact by way of ramp surfaces 13 on the clamping body and/or on the slide 12 that run at an angle to the sliding direction V.

The use of the fixation device 100 is as follows:

First, the contact element 40 is plugged into the contact element receptacle 24 along a plug-in direction E. The clamping device 10 is thereafter inserted into the contact element receptacle 24 along an insertion direction F which runs parallel to the plug-in direction E. In this step, the contact body 11 is pushed by the slide 12. A sliding surface 59 on the contact body 11 contacts with a mating sliding surface 69 on the slide 12. Once the clamping device 10 has reached a fitting position in the housing 20, the sliding surface 59 and the mating sliding surface 69 are automatically released from one another and made to disengage.

Thereafter, the slide 12 is slid relative to the clamping body 11 along a sliding direction V. In the example shown, the sliding direction is parallel to the plug-in direction E and to the insertion direction F in order to enable simple assembly. Due to the ramp surfaces 13, the clamping device 10 expands in the clamping direction K, which runs perpendicular to the sliding direction V, and clamps the contact element 40 along the clamping direction K with the clamping force 110 against the support surface 25. The support surface 25 is formed by ribs 26 that are spaced apart.

Due to the deflection surface 27 extending at an angle to the clamping direction K, the contact element 40 is clamped in a second direction in the contact element receptacle 24 in a transverse direction Q which runs transverse to the clamping direction K and transverse to the sliding direction V. The angle 127 which the deflection surface 27 defines relative to the clamping direction K is selected such that no self-locking occurs. Rather, it is possible for the contact element 40 to easily slide along the deflection surface 27. The deflection surface 27 can have an angle of 10 to 80 degrees relative to the clamping direction K. In particular, the angle can be 20 to 70 degrees, specifically 30 to 60 degrees. The smaller the angle, the easier it is for the contact element 40 to slide on the deflection surface 27, but the smaller also the force component created thereby. In the example shown, the angle 127 is approximately 20-30 degrees.

A force introduction point 49, at which the clamping device 10 transfers the clamping force 110 to the contact element 40 along the clamping direction K, is directly above the deflection surface 27. Legs 48 of the contact element 40 run parallel to the clamping direction K from the force introduction point 49 to the deflection surface 27.

The sliding direction V is parallel to the plugging direction S for enabling easy assembly. In order to prevent the contact element 40 from moving along the sliding direction V during clamping, the deflection surface 27 extends parallel to the sliding direction.

The deflecting surface 27 connects two perpendicular inner surfaces 29 of the contact element receptacle 24 to one another. The deflecting surface 27 extends along an inner edge 28 in the contact element receptacle 24. In the example shown, only a single deflection surface 27 is present, so that the contact element receptacle 24 is asymmetrical. The corresponding force flow or direction is likewise asymmetrical.

The clamping device 10 comprises a securing surface 56 on the contact body 11 with which it additionally secures the contact element 40 along the plug-in direction E in the contact element receptacle 24. The securing surface 56 engages behind a plugging section 44 of the contact element 40.

In the embodiment shown, the clamping body 11 rotates relative to the housing 20 and/or relative to the clamping body 11 when the slide 12 slides relative to clamping body. For this purpose, rotary bearings 34 are present on the clamping body 11 and on the slide 12. The rotary bearings 34 are formed on the clamping body 11, for example, as part of axle cams 51, 53.

Figure 3:
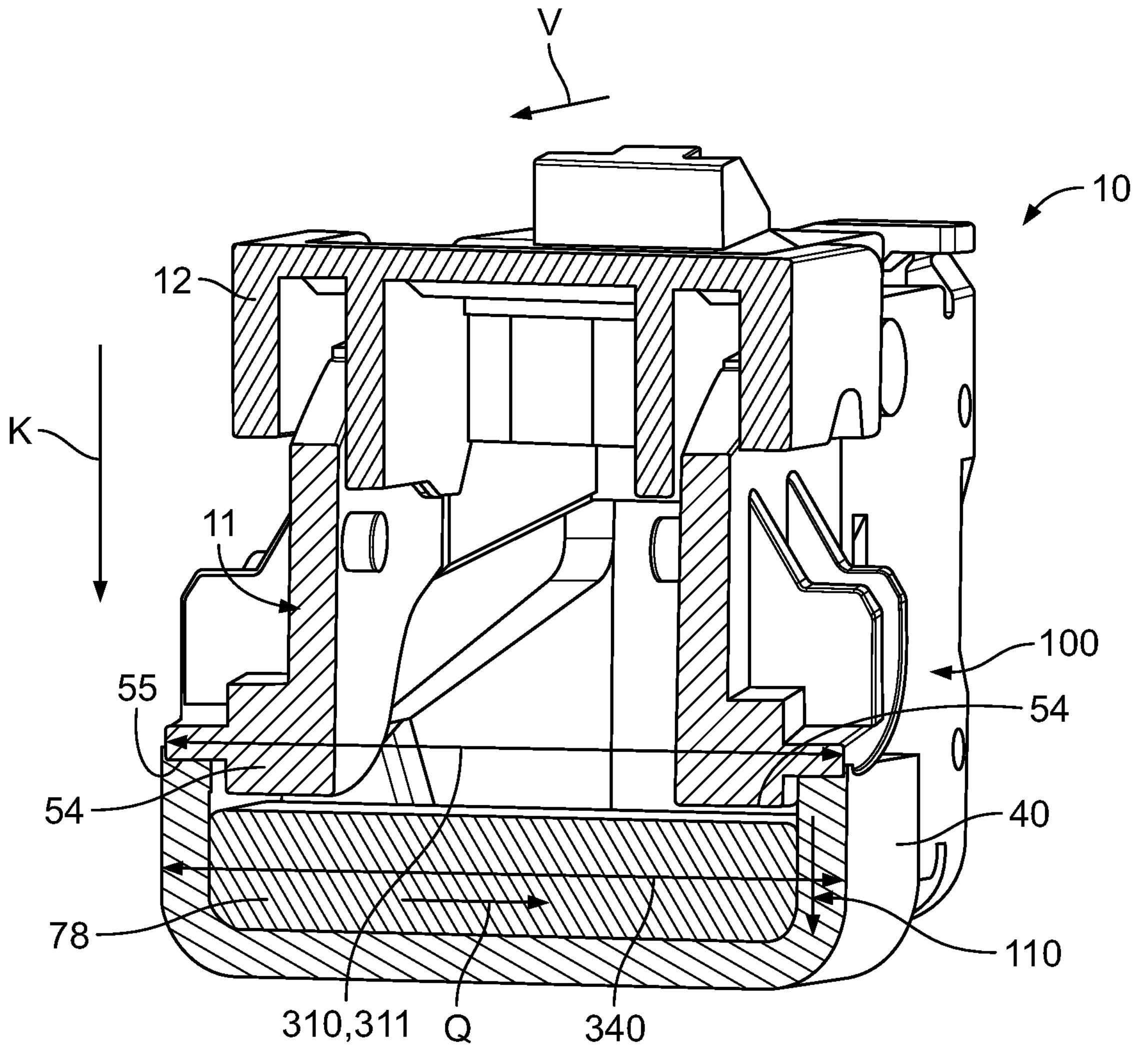
FIG. 3 shows a schematic, partially sectioned perspective view of a further embodiment of a fixation device.
Figure 4:
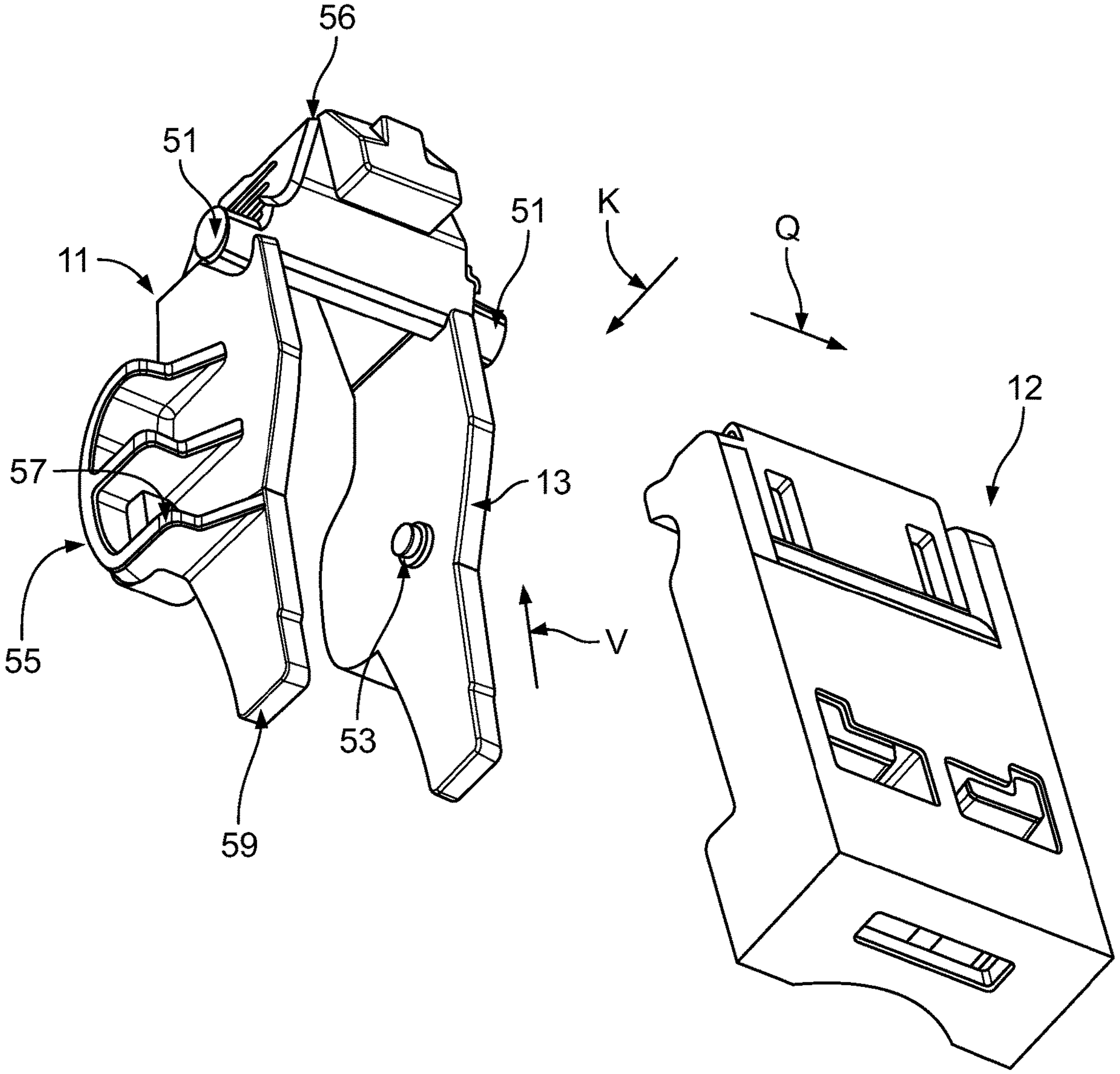
FIG. 4 shows a schematic perspective view of a clamping body and a slide.
Figure 5:
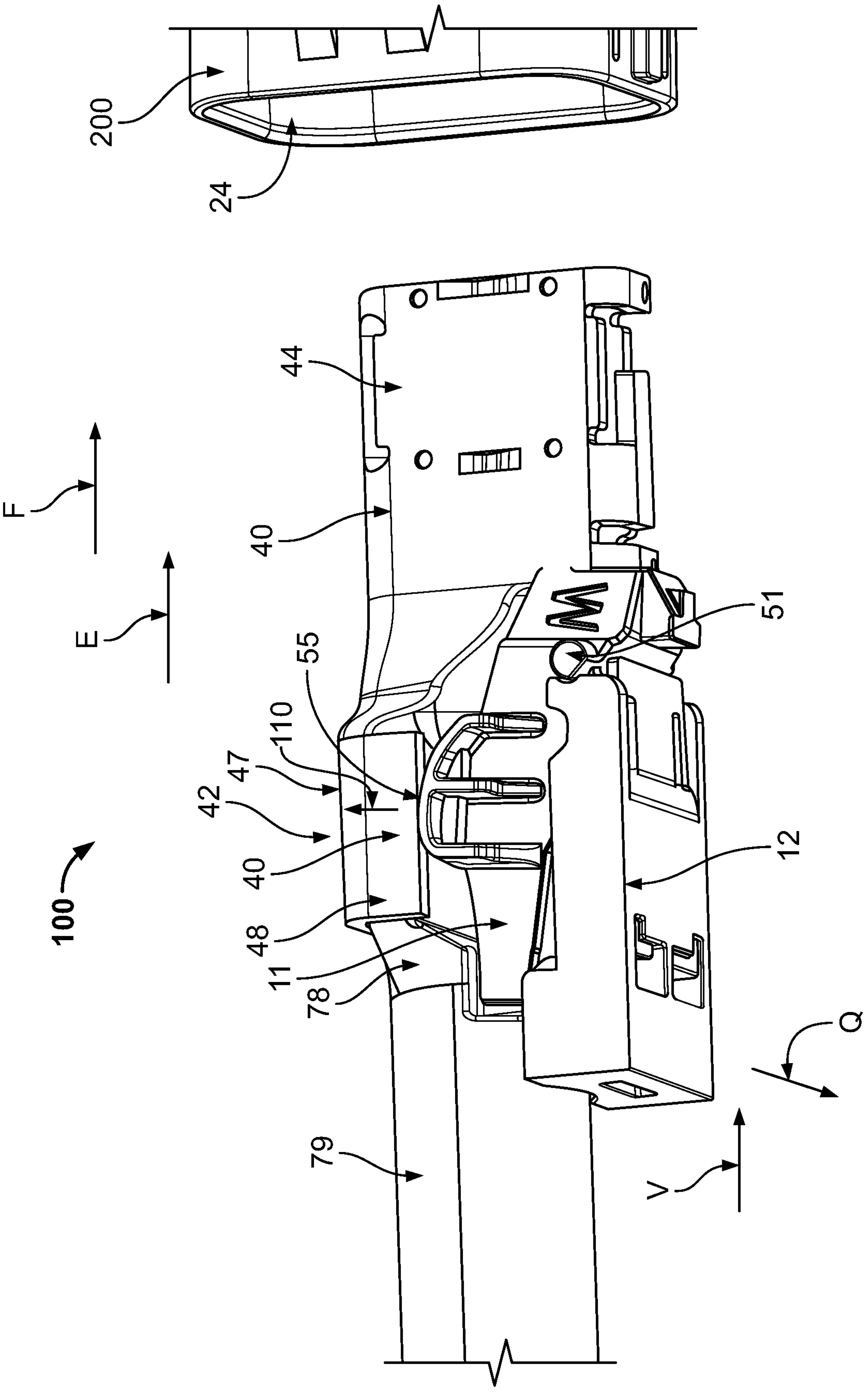
FIG. 5 shows a schematic perspective view of the fixation device of FIG. 3.
Figure 6:
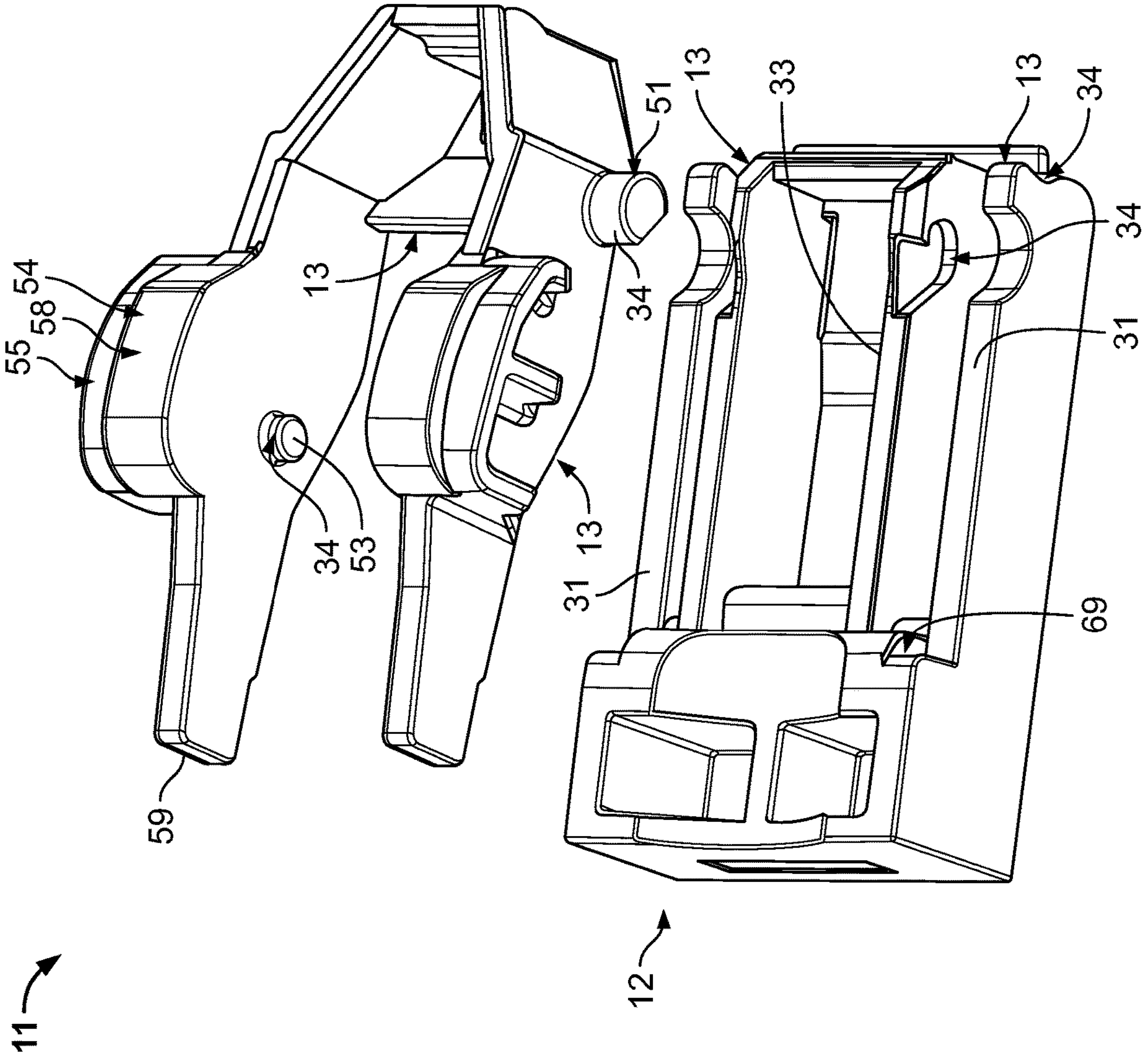
FIG. 6 shows a schematic perspective view of the clamping body and the slide from FIG. 4 from a different perspective.
Figure 7:
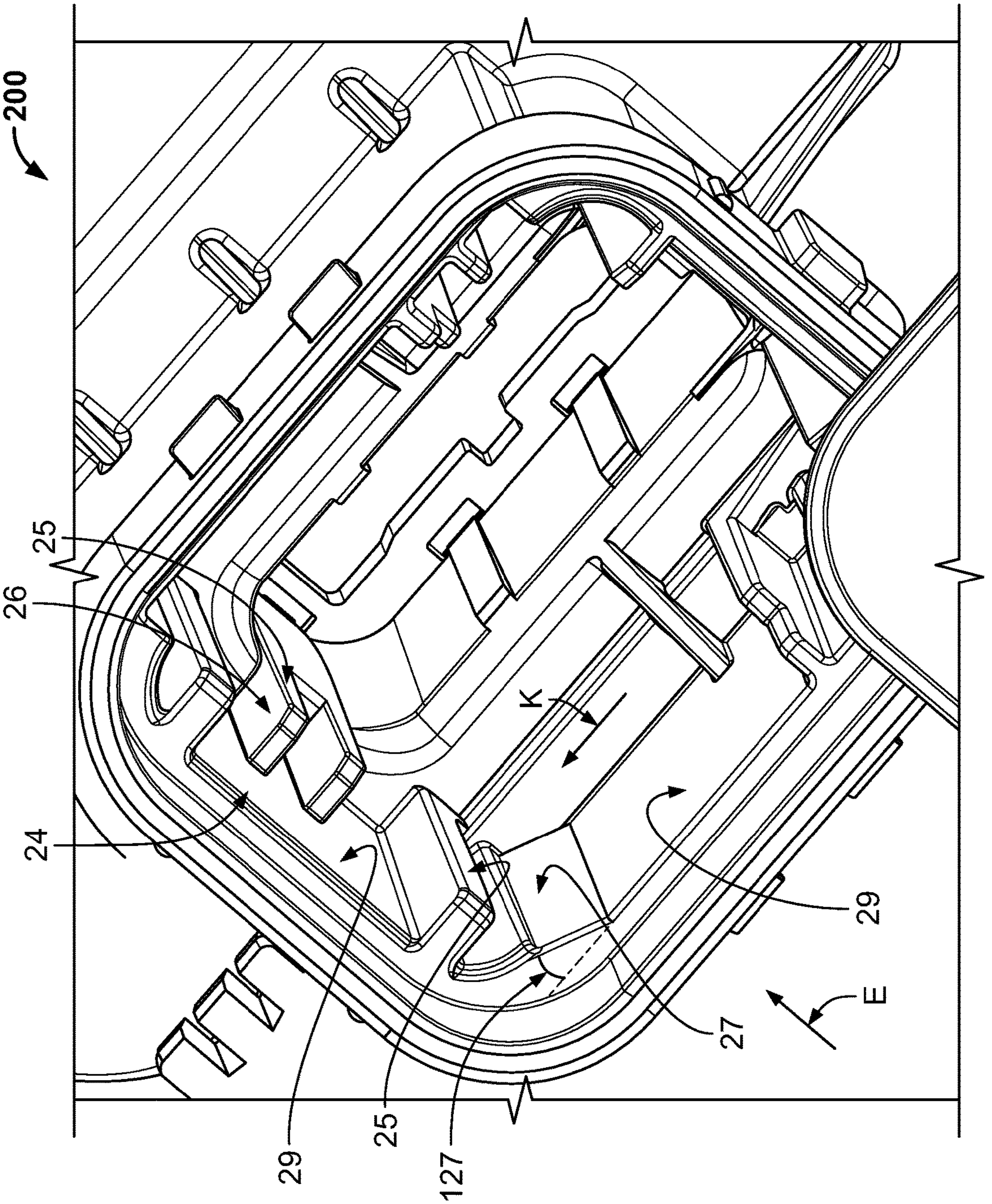
FIG. 7 shows a schematic perspective view of a contact element receptacle.

As can be seen, for example in FIG. 3, a width 310 of the clamping device 10 measured in the transverse direction Q, which is presently defined by a width 311 of the contact body 11, corresponds to a width 340 of the contact element 40. This enables a wide contact element 40 with a good clamping effect to be utilized.

The embodiment according to FIGS. 3-6 differs from that according to FIGS. 1 and 2 in that the clamping body 11 includes pressing elements 54 projecting into a receptacle 45 of the contact element 40. In the event of prolonged use, for example, over several years, the pressing elements 54 can ensure that sufficient clamping force 110 is still transmitted in the event of material fatigue of clamping body 11. For this purpose, pressing surfaces 58 present on the pressing elements 54 are arranged either in contact with the conductor 78 or slightly thereabove.

In order to generate high pressure, clamping surfaces 55 are supported on the remainder of the contact body 11 by flat, vertical reinforcement elements 57. The plane of these reinforcement elements 57 extends parallel to the clamping direction K and parallel to the transverse direction Q. To guide the clamping body 11 and the slide 12 relative to one another and relative to the housing 20, guide elements 31, 33 are provided which enable guided, defined motions along a path. The clamping device 10 can be secured in a housing 20 in a direction opposite to the insertion direction F by way of further elements, in particular rearward sealing elements.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of said elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A fixation device for fixing a contact element within a connector, comprising:
- a housing including the contact element receptacle for receiving a contact element, and a support face defining a deflection surface for supporting the contact element within the housing; and
- a clamping device for clamping the contact element in the contact element receptacle with a clamping force directed in a clamping direction, the deflection surface oriented at an angle relative to the clamping direction such that the deflection surface deflects a component of the clamping force acting upon the contact element in a direction transverse to the clamping direction.

2. The fixation device of claim 1, wherein the support face supports the contact element on a side thereof opposite to and facing away from the clamping device.

3. The fixation device according to claim 1, wherein the clamping device includes a clamping body and a slide slidable relative to the clamping body along a sliding direction, the slide pressing the clamping body in the clamping direction and against the contact element when the slide slides along the sliding direction.

4. The fixation device according to claim 3, wherein the deflection surface extends parallel to the sliding direction.

5. The fixation device according to claim 3, wherein the sliding direction runs parallel to a plug-in direction along which the contact element is plugged into the contact element receptacle.

6. The fixation device according to claim 5, wherein the deflection surface extends parallel to the plug-in direction.

7. The fixation device according to claim 5, wherein an insertion direction along which the clamping device is inserted into the contact element receptacle is parallel to the plug-in direction.

8. The fixation device according to claim 5, wherein the clamping device secures the contact element along the plug-in direction.

9. The fixation device according to claim 5, wherein a plugging direction along which the connector is plugged to a mating connector runs parallel to the plug-in direction.

10. The fixation device according to claim 3, wherein the clamping body rotates relative to the housing when the slide slides relative to the clamping body.

11. The fixation device according to claim 1, wherein a width of the clamping device measured in a transverse direction corresponds to a width of the contact element.

12. The fixation device according to claim 1, wherein the deflection surface extends obliquely from at least one inner surface of the contact element receptacle.

13. The fixation device according to claim 12, wherein the deflection surface extends obliquely from and between two inner surfaces of the contact element receptacle.

14. The fixation device according to claim 13, wherein the two inner surfaces of the contract receptacle are perpendicular inner surfaces and the deflection surface connects the two perpendicular inner surfaces of the contact element receptacle to one another.

15. The fixation device according to claim 12, wherein the deflection surface has an angle of 30 to 60 degrees relative to the clamping direction.

16. The fixation device according to claim 12, wherein, as a result of the deflection of the component of the clamping force by the deflection surface, the contact element is clamped in two spatial directions within the contact element receptable by the clamping device.

17. An electrical connector, comprising:
- a fixation device including:
  - a housing including a contact element receptacle for receiving a contact element and, a support face defining a deflection surface; and
  - clamping device for clamping the contact element in the contact element receptacle with a clamping force directed in a clamping direction, the clamping device including a clamping body and a slide slidable relative to the clamping body along a sliding direction, the clamping body rotates relative to the housing on at least one bearing surface as the slide moves relative to the clamping body; and
- a contact element surrounding a conductor of a cable on at least three sides in the region of the clamping device, the contact element resting on the support face of the housing, the deflection surface oriented at an angle relative to the clamping direction such that the deflection surface deflects a component of the clamping force acting upon the contact element in a direction transverse to the clamping direction, the slide pressing the clamping body in the clamping direction and against the contact element when the slide slides along the sliding direction.

18. The electrical connector of claim 17, wherein the clamping device includes pressing elements projecting into a receptacle of the contact element.

19. The electrical connector of claim 17, wherein the clamping body defines a ramp surface engaging with the slide, the ramp surface extending at an angle relative to the sliding direction.

20. A fixation device for fixing a contact element within a connector, comprising:
- a housing including a contact element receptacle for receiving the contact element, and a support face defining a deflection surface for supporting the contact element within the housing; and
- a clamping device for clamping the contact element in the contact element receptacle with a clamping force directed in a clamping direction, the deflection surface oriented at an angle relative to the clamping direction such that the deflection surface deflects a component of the clamping force acting upon the contact element in a direction transverse to the clamping direction, the clamping device includes a clamping body and a slide slidable relative to the clamping body along a sliding direction, the slide pressing the clamping body in the clamping direction and against the contact element when the slide slides along the sliding direction, one of the clamping body or the slide defines a ramp surface therebetween, the ramp surface extending at an angle relative to the sliding direction.

* * * * *